H. W. RIES.
SIGN OR CARD CLAMP.
APPLICATION FILED APR. 15, 1911.
1,026,772.
Patented May 21, 1912.
2 SHEETS—SHEET 1.
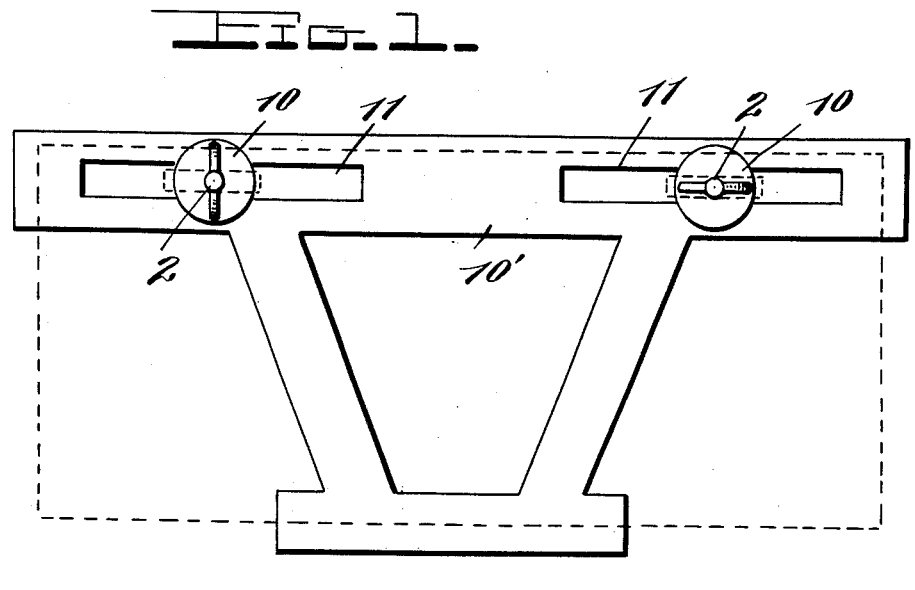
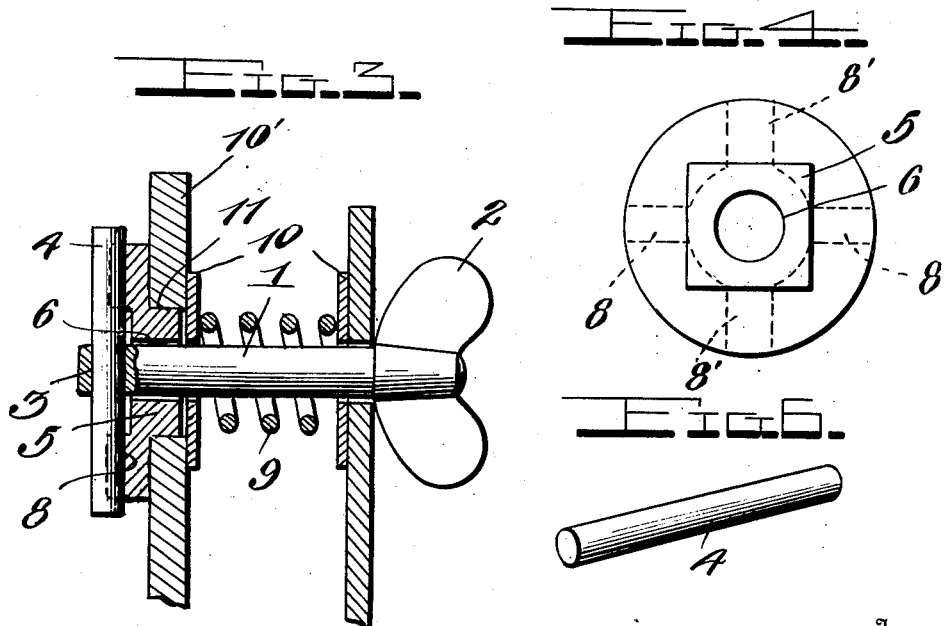
Witnesses
Chas. L. Griestauer.
L. G. Ellis.
Inventor
Harry W. Ries,
By Watson E. Coleman.
Attorney H. W. RIES.
SIGN OR CARD CLAMP.
APPLICATION FILED APR. 15, 1911.
1,026,772.
Patented May 21, 1912.
2 SHEETS—SHEET 2.
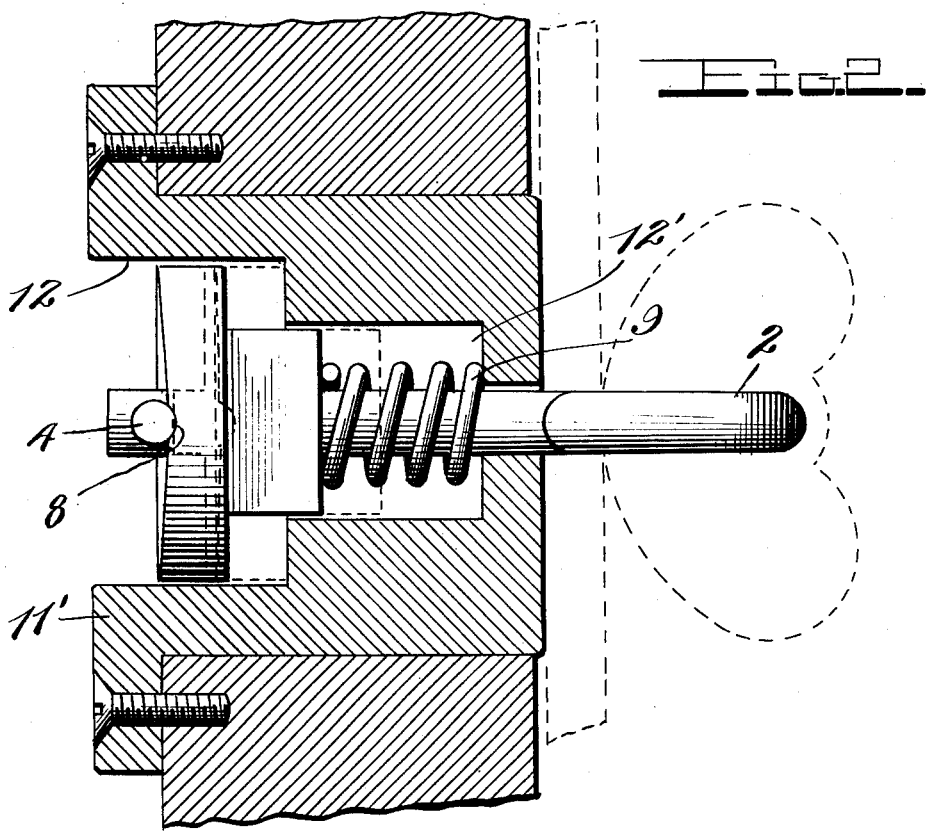
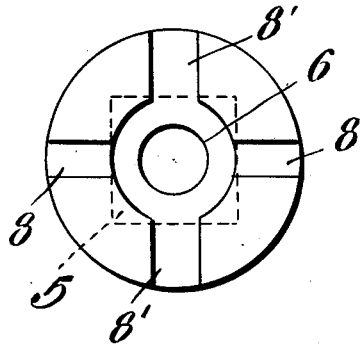
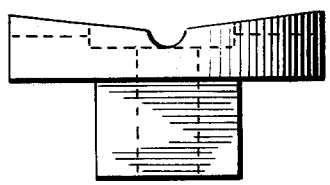
Inventor
Harry W. Ries,
By Watson E. Coleman.
Attorney
Witnesses
Chas. L. Griestauer.
L. G. Ellis.

UNITED STATES PATENT OFFICE.

HARRY W. RIES, OF COLLINGSWOOD, NEW JERSEY.

SIGN OR CARD CLAMP.

1,026,772.  Specification of Letters Patent.  Patented May 21, 1912.

Application filed April 15, 1911. Serial No. 621,434.

*To all whom it may concern:*

Be it known that I, HARRY W. RIES, a citizen of the United States, residing at Collingswood, in the county of Camden and State of New Jersey, have invented certain new and useful Improvements in Sign or Card Clamps, of which the following is a specification, reference being had to the accompanying drawings.

The invention relates to devices for fastening automobile license tags, signs, carriage or automobile covers, and fasteners of many other articles of a like nature.

The object of my invention is to provide means whereby a license tag, sign, automobile covers and the like may be clamped into position quickly and securely, without the use of loose nuts and bolts.

Another object of my invention is to provide such a locking device or fastener which cannot be loosened by the constant vibration caused by the jolts and jars of the car.

Other objects of my invention will become apparent as my invention is more fully set forth.

In the drawings, which illustrate by way of example embodiments of my invention, Figure 1 represents a fastener embodying my invention holding a license card or the like to a frame; Fig. 2 indicates an embodiment of my invention for holding automobile covers and the like; Fig. 3 is a view partly in section of the fastener shown in Fig. 1; Fig. 4 is a plan of the washer nut; Fig. 5 is a bottom view of Fig. 4; Fig. 6 is a view in perspective of a locking pin; and Fig. 7 shows another modification of a fastener.

In the appended drawings, 1 represents the shank of a fastening bolt which has a winged head 2 disposed on the upper end thereof, and a hole 3 in the bottom portion arranged to receive a locking pin 4. A winged head is chosen for this bolt in order to provide a means whereby it can be made into a lock. The head is intended to be inserted in a suitable longitudinal slot and after insertion turned at right angles so that the edges of the winged head of the bolt will prevent the bolt from being pulled through the slot.

5 is a locking washer nut having a hole 6 arranged to receive the lower portion of the shank 1, this washer nut having its upper portion of a polygonal shape in order for it to lock in a frame in which it is inserted during the locking operation to be described later. The bottom of the washer 7 is provided with a suitable number of recesses or grooves 8, 8' which extend across the bottom of this washer, and in two directions, the depth of these grooves differing by the amount necessary to give the locking movement of the bolt, that is, the groove 8 is comparatively narrow while the groove 8' is relatively deep, that is, deeper than the groove 8 by an amount that it is necessary or desirable to have the movement of the winged head of the bolt go through to lock the tag or other article which is underneath it.

9 is a spring disposed around the shank 1 of the bolt and serves to keep two washers or stop devices 10 in tension. Between the upper washer 10 and the head 2 is held the card or license tag, the pressure of the spring on the washer being transmitted onto the card, serving to hold it securely in place.

In operation, the fastening bolt is inserted in a frame 10', which can be of any suitable type, but which must be provided with a slot 11 arranged to receive the head 5 of the washer nut, in order that the nut will not rotate therein. After the nut is in position, the shank 1 of the bolt is inserted through its washer 10 and its spring 9, through the hole 6 in the washer nut, as clearly shown in Fig. 3. When the shank has been inserted through the nut the locking pin 4 is inserted through the hole 3 in the shank 1. The head of the bolt is then turned to receive the slot of the card or license tag which is to be inserted over the head of this device, and then the head 2 is turned to a vertical position and locks the card in place. After the card has been placed over this head 2, the winged head is turned, so that the pin 4 is disposed in the relatively narrow slot 8, which, of course, pulls the head toward the frame 10', and puts the spring 9 under tension and causes the tag to be firmly locked.

To unloosen the tag from the fastener the head 2 is turned to the direction of the slot in the card, at the same time the pin 4 is removed from the narrow slot 8 and turned into the comparatively deep slot 8' which permits the bolt to lengthen as it were, and relieve the pressure of the spring and washers on the card, thereby permitting the card to be slipped over the head and removed.

Referring particularly to Fig. 2, which represents a fastener used in conjunction with an automobile cover or the like, a somewhat similar bolt is used as already described and shown in Fig. 1, but, in addition, a U-shaped piece 11' is provided in order to form a base for the bolt 2 to rest in and to clamp the cover in its desired position. This U-shaped piece 11' is clearly shown in Fig. 2 and has a portion 12 adapted to receive the lower and circular portion of the nut, and an upper portion 12' to receive the upper portion 5, together with the spring 9, the pin 4 being disposed beneath the lower portion of the washer nut and adapted to be inserted in the grooves 8 and 8', and thereby tighten the head 2, or loosen it from the parts to be clamped.

While I have described my device as particularly suitable for fastening tags, signs and automobile covers and the like, I contemplate its use for many other purposes, for which such a bolt would be particularly suitable. In this class of bolt it is only necessary that the parts which are to be clamped to a framework or stationary article, should have a slot therein to receive the head of the bolt longitudinally, so that after the head is inserted it can be turned and thereby crossed over the slot, and lock the piece in position.

I anticipate the use of many modifications in various parts of this device, as come within the scope of the appended claims.

Obviously while I have only shown two pairs of grooves, I anticipate the use of more or less than this number should circumstances benefit their use, and I do not wish to limit myself in any way otherwise than necessitated by the prior art as many modifications in the construction of my invention can be made without departing from the principles thereof.

The advantages of my device are that it obviates the necessity of loose nuts and threaded portions on the fastener, it can be easily and readily attached, it is positive and secure in its action, and is comparatively cheap to manufacture.

The greatest advantage of my fastener consists in its quick adjustment and locking action, and its characteristic in being capable of remaining intact under the severe service it is particularly intended for, in addition to the usual desirable points of similar types of fasteners which it does not sacrifice in the least. Further, the wedge shaped wings of the nut have a great wedging effect on the article to be fastened in close contact with the frame, particularly in the case of various types of tags, curtains and covers used in automobiles and the like.

Having thus described my invention, I claim:

1. A locking device comprising in combination a circular shank having a winged head on the upper portion thereof and a hole disposed at right angles to the axis of the shank through the bottom portion thereof, a locking washer nut disposed and movable on said shank and having grooves of various depths on the bottom portion thereof, a plurality of spaced stop devices disposed on said shank between said head and said nut, resilient means between said stop devices adapted to press said stop devices against said head and said nut, and a pin adapted to be disposed in said hole and engage the grooves to lock the shank and washer-nut together.

2. A locking device comprising in combination a circular shank having a winged head on the upper portion thereof and a hole disposed at right angles to the axis of the shank through the bottom portion thereof, a washer nut disposed and movable on said shank having its upper portion of rectangular shape and its lower portion circular, said bottom portion having a plurality of grooves therein, said grooves being of various depth, a plurality of spaced stop devices disposed on said shank between said head and said nut, resilient means between said stop devices adapted to press said stop devices against said head and said nut, and a pin adapted to be disposed in said hole and arranged to lock said shank in position.

3. A locking device comprising in combination a shank having a winged head on the upper portion thereof and a hole disposed at right angles to the axis of the shank and through the bottom portion thereof, a locking washer-nut disposed and movable on said shank, and having grooves of various depths on the bottom portion thereof, resilient means disposed between said head and washer-nut, and a pin adapted to be disposed in said hole and engage the grooves to lock the shank and washer-nut together.

In testimony whereof I hereunto affix my signature in the presence of two witnesses.

HARRY W. RIES.

Witnesses:
D. G. SCHOENLY,
WM. M. DOYLE.